United States Patent [19]
Berwin et al.
[11] 3,925,765
[45] Dec. 9, 1975

[54] DIGITAL RASTER ROTATOR

[75] Inventors: Ted W. Berwin; Everett T. Wilbur, both of Playa Del Rey, Calif.
[73] Assignee: Hughes Aircraft Company, Culver City, Calif.

[22] Filed: Oct. 29, 1973
[21] Appl. No.: 411,546
[52] U.S. Cl. .............. 340/172.5; 235/189; 35/10.2; 340/324 AD; 340/27 AT; 315/378; 178/7.7; 178/DIG. 6
[51] Int. Cl.$^2$. G06F 3/00; G06F 3/14; G01C 21/20; H01J 29/70
[58] Field of Search..... 340/172.5, 27 NA, 324 AD, 340/27 AT, 324 A; 235/189, 198; 315/18, 18 XR, 378; 178/7.7, DIG. 6, DIG. 35; 35/10.2

[56] References Cited
UNITED STATES PATENTS

| | | | |
|---|---|---|---|
| 3,292,157 | 12/1966 | Mellow | 340/172.5 |
| 3,394,366 | 7/1968 | Dye | 340/324 |
| 3,403,391 | 9/1968 | McCown | 340/324 |
| 3,422,419 | 1/1969 | Matthews | 340/324 |
| 3,500,332 | 3/1970 | Vosbury | 340/172.5 |
| 3,614,766 | 10/1971 | Kilsvit | 340/324 A |
| 3,621,214 | 11/1971 | Romney | 235/151 |
| 3,725,723 | 3/1973 | Colston | 375/22 |
| 3,786,477 | 1/1974 | Baumgartner | 340/324 AD |
| 3,789,200 | 1/1974 | Childress | 235/151 |
| 3,789,356 | 1/1974 | Harenberg | 340/27 NA |
| 3,821,729 | 6/1974 | Schultze | 340/324 |

*Primary Examiner*—Gareth D. Shaw
*Assistant Examiner*—James D. Thomas
*Attorney, Agent, or Firm*—W. H. MacAllister; Martin E. Gerry

[57] ABSTRACT

Symbols, such as an artificial horizon, present in a memory register may be rotated by altering timing of a series of video events. A method is provided for precisely modifying the timing of the events using digital means to create a phantom raster and providing a visual indication of rotation of the artificial horizon with respect to a generated phantom raster. Such method utilizes a source of data, in terms of angle of roll, pitch and amount of vertical offset of an aircraft with respect to the artificial horizon, as may be provided by an airborne computer. This data and timing signals are processed by a function processor fed to a series of up and down counters the outputs of which are applied to a read memory for providing an apparent rotation of the artificial horizon symbol with respect to the raster. The output of the memory is mixed with a composite synchroniziing signal and fed to a television receiver for viewing the rotated symbol. Vertical offset of the artificial horizon symbol or angle of pitch of the aircraft are also provided by the system described herein.

15 Claims, 6 Drawing Figures

DIGITAL RASTER ROTATOR

U.S. GOVERNMENT INTEREST IN INVENTION

The invention herein described was made in the course of or under a Contract or Subcontract thereunder with the United States Navy.

RELATED PUBLICATIONS

Texas Instrument Bulletin CA-160 shows details of a binary rate multiplier SN 7497 used herein within function processor 300. Texas Instrument specification and details of SN 74LS191 type synchronous up-down counters as published in Bulletin No. DL-S 7211865 of December 1972 of which a plurality of such counters are utilized as components of counter 500. Bulletin dated June 1972 published by Intel Corporation shows details and specifications for read only memory 600. Bulletin RS-343-A published by Electronic Industries Association and dated September 1969 discloses details of the composite waveform as obtained in a high resolution television camera and available as an output from clock and timing circuit 200.

BACKGROUND OF THE INVENTION

This invention is the field of video raster generation or rotation of video images with respect to a generated phantom raster. This invention provides means by which symbols or other images may appear to be rotated with respect to a predetermined cartesian coordinate system as viewed on a television receiver.

Symbols have been previously rotated by placing a given symbol before a television camera and rotating the camera with respect to the field of view on which the symbol is positioned. The image on the television receiver will thus rotate in a direction opposite the angle of camera rotation.

However, this approach is not feasible in use in an operational aircraft where control over aircraft roll angle is desired and compensation therefor as well as compensation for aircraft pitch and compensation for vertical shift in the reference horizon symbol, must be made.

Prior art publications as applicable to this invention includes Model ROM 3601, Bipolar Programmable Read Only Memory, published in unnumbered bulletin, June 1972 by INTEL CORP. of Santa Clara, California.

SUMMARY OF THE INVENTION

It is therefore the object of this invention to provide digital electronic circuitry that will rotate a phantom raster generated by the circuitry, that will in effect translate a first and conventional cartesian coordinate system of a television camera frame into a second cartesian coordinate system wherein the angular displacement of the second coordinate system from the first coordinate system is related to the roll angle of the aircraft.

Other objects, such as providing for information as to the angle of pitch of the aircraft and vertical offset of a horizon symbol from a central location on a television screen, as viewed in the transformed or rotated raster thereon will become apparent by reading the detailed description in conjunction with the drawings herein.

Briefly, according to this invention a data source, which could be a computer, a data storage device or driven potentiometers driving analog-to-digital converters, could provide data to four storage registers which act as memories. Data in binary form representing the angle of rotation $\theta$, in terms of sin $\theta$ and cos $\theta$, data in binary form representing pitch angle P, and data representing vertical offset A which is a vertical distance with respect to the vertical ordinate of the rotated raster, are provided as inputs to a function processor to make this system operative. A fast 18MHz clock and a slow 15.75KHz clock provide pulses of constant value referred to respectively as $dx$ and $dy$. Such $dx$ and $dy$ pulse information is also provided as input to the function processor.

Six rate multipliers are used to generate specific functions. The outputs of the six rate multipliers provide specific functions through four ganged switches to up and down counters and the output of four other ganged switches provide outputs from the four clocks required by the four counter units comprising the up and down counters.

A two-bit binary signal provides capability of stepping both four-ganged sets of switches to switch positioning means. The two-bit binary signal is provided by the clock and timing unit. Signals in binary form provide data into the up and down counters. A $U_0$ counter furnishes the initial conditions for the U counter and a $V_0$ counter likewise for the V counter of the up and down counter group. Thus each count represents a displacement in time, determined by the initial position of a rotated line and the rate at which points on the line move. Signals as a function of $U_{00}$ and $V_{00}$ are used to address the read only memory. Such address enables the memory to initiate location of the start scanning point of any one frame of the 30 frames per second generated by the system. The read only memory is a 250 word by 4 bit module mounted on a dual in-line chip. Output high levels can be electrically programmed at selected bit locations. These bit locations represent the locations in U and V coordinates of the symbol field and the U and V counters furnish the addresses to these bit locations.

The counter outputs, representing symbol video locations, such as an artificial horizon, are applied to read only memory so that the coincidence in time of these counts will result in a video output.

The video output of read only memory is mixed with standard television synchronizing and blanking pulses in a mixer circuit.

After mixing, composite synchronized video is applied to a standard television monitor. The result on the screen comprises a raster seemingly rotated with respect to an artificial horizon symbol therein. The artificial horizon may appear to be shifted upward or downward by controlling the values of vertical offset parameters, and the pitch angle of the aircraft controlled with respect to the artificial horizon by control of the pitch parameters as provided by the data source.

DETAILED DESCRIPTION

Figure 1:
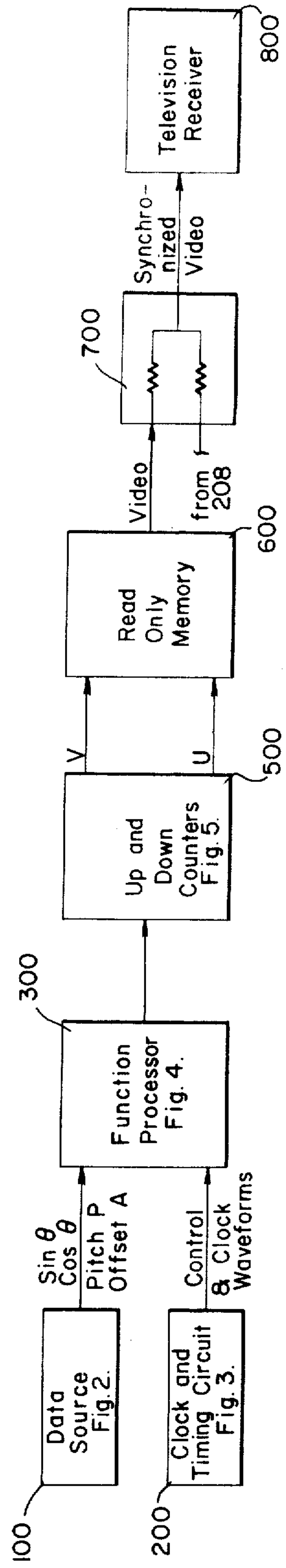
FIG. 1 is a block diagram schematic of the major subsystems comprising this invention.

Referring generally to FIG. 1, data source is provided at 100. Such data source generally comprises an airborne computer and storage registers providing specific values and sense of the sine and cosine of the angle of roll of an aircraft, the value of pitch and the vertical offset with respect to the center of an artificial horizon registered in a memory of the system comprising this invention. Clock and timing circuits are provided as at 200, which in combination with the output of data source 100 provide the requisite inputs to function processor 300. Processor 300 provides input information to up and down counters as at 500 which in turn provides in terms of U and V deflection signals, expressible by means of cartesian coordinates to read only memory 600. U and V cartesian coordinate system is a transformed X and Y cartesian coordinate system wherein the axes of transformation are shifted by an angle $\theta$, the roll angle. The output of memory 600 and a composite synchronization waveform, as provided at 208 by clock and timing circuit 200, are mixed in resistive mixer 700, the output of which is provided as an input to television receiver 800.

Figure 2:
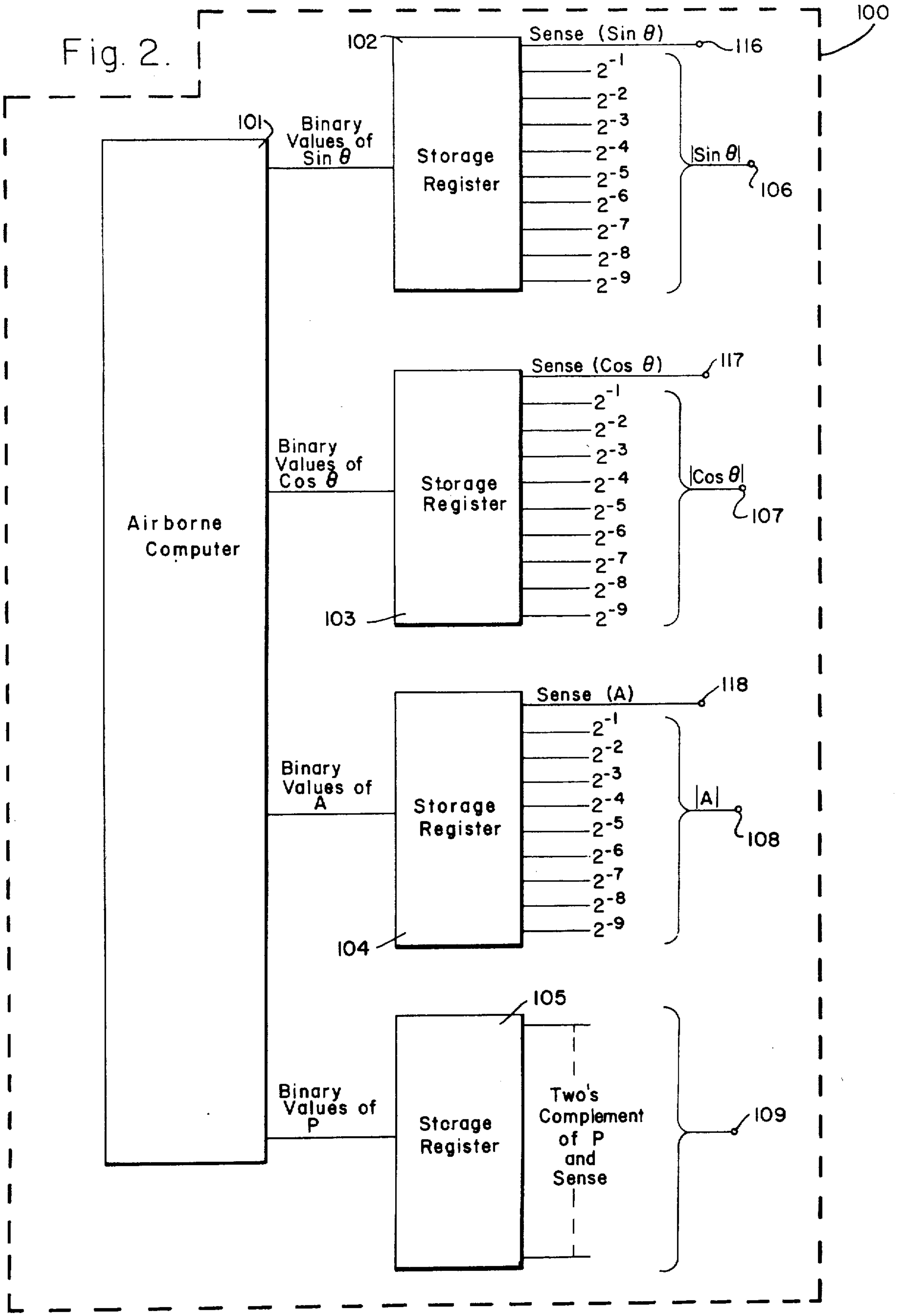
FIG. 2 is a more detailed block diagram of the data source outputs and storage registers for data provided by an airborne computer.

Referring to FIG. 2, data source 100 comprises airborne computer 101 and binary bit storage registers 102, 103, 104 and 105.

Computer 101, or in the alternative a data storage device, provides a series of discrete binary bit chain of pulses as inputs to registers 102–105. A nine bit binary code, and their sense conditions in binary 0 and 1 code, for the sin $\theta$, and cos $\theta$ representing the roll angle of the aircraft and value of DC vertical offset voltage A, are best shown by Table 1 hereinbelow, which illustrates representative numbers selected from a group of 512 negative and positive numbers ranging between zero and unity, and their sense conditions. Such numbers are equal to their positive and negative decimal equivalents, ranging between zero and substantially unity values, thereby accommodating all possible values of the sin $\theta$, cos $\theta$ and A and their sense conditions registered respectively in registers 102, 103 and 104.

TABLE 1

DECIMAL TO BINARY CODE CONVERSION VALUES - SIN $\theta$, COS $\theta$ or A

| Decimal Equivalent | | Binary Equivalent | | | | | | | | | |
|---|---|---|---|---|---|---|---|---|---|---|---|
| Fractional Form | Decimal Form | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | Sense Condition in Binary Form |
| $(511)(512)^{-1}$ | .99804 | 1 | 1 | 1 | 1 | 1 | 1 | 1 | 1 | 1 | 0 |
| . | . | . | . | . | . | . | . | . | . | . | . |
| $(5)(512)^{-1}$ | .00976 | 0 | 0 | 0 | 0 | 0 | 0 | 1 | 0 | 1 | 0 |
| $(4)(512)^{-1}$ | .00781 | 0 | 0 | 0 | 0 | 0 | 0 | 1 | 0 | 0 | 0 |
| $(3)(512)^{-1}$ | .00586 | 0 | 0 | 0 | 0 | 0 | 0 | 0 | 1 | 1 | 0 |
| $(2)(512)^{-1}$ | .00391 | 0 | 0 | 0 | 0 | 0 | 0 | 0 | 1 | 0 | 0 |
| $(1)(512)^{-1}$ | .00195 | 0 | 0 | 0 | 0 | 0 | 0 | 0 | 0 | 1 | 0 |
| $(0)(512)^{-1}$ | 0 | 0 | 0 | 0 | 0 | 0 | 0 | 0 | 0 | 0 | 0 |
| $-(0)(512)^{-1}$ | 0 | 0 | 0 | 0 | 0 | 0 | 0 | 0 | 0 | 0 | 1 |
| $-(1)(512)^{-1}$ | −.00195 | 0 | 0 | 0 | 0 | 0 | 0 | 0 | 0 | 1 | 1 |
| $-(2)(512)^{-1}$ | −.00391 | 0 | 0 | 0 | 0 | 0 | 0 | 0 | 1 | 0 | 1 |
| $-(3)(512)^{-1}$ | −.00586 | 0 | 0 | 0 | 0 | 0 | 0 | 0 | 1 | 1 | 1 |
| $-(4)(512)^{-1}$ | −.00781 | 0 | 0 | 0 | 0 | 0 | 0 | 1 | 0 | 0 | 1 |
| $-(5)(512)^{-1}$ | −.00976 | 0 | 0 | 0 | 0 | 0 | 0 | 1 | 0 | 1 | 1 |
| . | . | . | . | . | . | . | . | . | . | . | . |
| $-(511)(512)^{-1}$ | −.99804 | 1 | 1 | 1 | 1 | 1 | 1 | 1 | 1 | 1 | 1 |

The binary bit code converted to TWO's complement binary bit values are similarly supplied by DC voltage P, representing the pitch of the aircraft, as an input to storage register 105. The TWO's complement binary bit code is also expressed as a nine bit binary code in Table 2, hereinbelow, includes the sense conditions, and illustrates selected representative numbers from a group of 512 positive and negative numbers ranging between zero and unity. Table 2 also shows the decimal equivalent of the various binary numbers expressed in TWO's complement form for the range of values of P encountered in this invention.

Hence, storage register 105 has ten output wires, similar to the number of output wires from registers 102, 103 and 104. However, in register 105 the sense condition binary bit always accompanies the TWO's complement binary bit stream, and consequently only one output such as output 109 need be shown representing all ten output wires of register 105.

TABLE 2

DECIMAL TO BINARY CODE CONVERSION VALUES - in TWO's COMPLEMENT of P

| Decimal Equivalent | | Binary Equivalent | | | | | | | | | |
|---|---|---|---|---|---|---|---|---|---|---|---|
| Fractional Form | Decimal Form | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | Sense Condition in Binary Form |
| $(511)(512)^{-1}$ | .99804 | 1 | 1 | 1 | 1 | 1 | 1 | 1 | 1 | 1 | 0 |
| . | . | . | . | . | . | . | . | . | . | . | . |
| $(5)(512)^{-1}$ | .00796 | 0 | 0 | 0 | 0 | 0 | 0 | 1 | 0 | 1 | 0 |

TABLE 2-continued

DECIMAL TO BINARY CODE CONVERSION VALUES - in TWO's COMPLEMENT of P

| Decimal Equivalent | | Binary Equivalent | | | | | | | | | |
|---|---|---|---|---|---|---|---|---|---|---|---|
| Fractional Form | Decimal Form | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | Sense Condition in Binary Form |
| $(4)(512)^{-1}$ | .00781 | 0 | 0 | 0 | 0 | 0 | 0 | 1 | 0 | 0 | 0 |
| $(3)(512)^{-1}$ | .00586 | 0 | 0 | 0 | 0 | 0 | 0 | 0 | 1 | 1 | 0 |
| $(2)(512)^{-1}$ | .00391 | 0 | 0 | 0 | 0 | 0 | 0 | 0 | 1 | 0 | 0 |
| $(1)(512)^{-1}$ | .00195 | 0 | 0 | 0 | 0 | 0 | 0 | 0 | 0 | 1 | 0 |
| $(0)(512)^{-1}$ | 0 | 0 | 0 | 0 | 0 | 0 | 0 | 0 | 0 | 0 | 0 |
| $-(1)(512)^{-1}$ | −.00195 | 1 | 1 | 1 | 1 | 1 | 1 | 1 | 1 | 1 | 1 |
| $-(2)(512)^{-1}$ | −.00391 | 1 | 1 | 1 | 1 | 1 | 1 | 1 | 1 | 1 | 1 |
| $-(3)(512)^{-1}$ | −.00586 | 1 | 1 | 1 | 1 | 1 | 1 | 1 | 0 | 1 | 1 |
| $-(4)(512)^{-1}$ | −.00781 | 1 | 1 | 1 | 1 | 1 | 1 | 1 | 0 | 0 | 1 |
| $-(5)(512)^{-1}$ | −.00796 | 1 | 1 | 1 | 1 | 1 | 1 | 0 | 1 | 1 | 1 |
| . | . | . | . | . | . | . | . | . | . | . | . |
| . | . | . | . | . | . | . | . | . | . | . | . |
| $-(512)(512)^{-1}$ | −1.0000 | 0 | 0 | 0 | 0 | 0 | 0 | 0 | 0 | 0 | 1 |

Hence, storage registers 102, 103 and 104 each provides nine binary bits representing a particular number and one binary bit representing the zero or one sense of that number, and register 15 provides ten binary bits in the TWO's complement for code for a particular number including the sense bit information.

Accordingly the absolute values of sin $\theta$ in binary bit form will be available as an output at terminal 106, and the sense of the sin $\theta$ in binary bit form will be available at terminal 116.

The absolute values of cos $\theta$ in binary bit form will be available as an output at terminal 107, and the sense of cos $\theta$ in binary bit form will be available at terminal 117.

The absolute values of DC vertical offset voltage A, in binary bit form will be available as an output at terminal 108, and the sense of A in binary bit form will be available at terminal 118.

The absolute values of DC voltage P representing the aircraft pitch in TWO's complement binary form will be available as an output stream together with a binary bit representing the sense of P, all at terminal 109.

Figure 3:
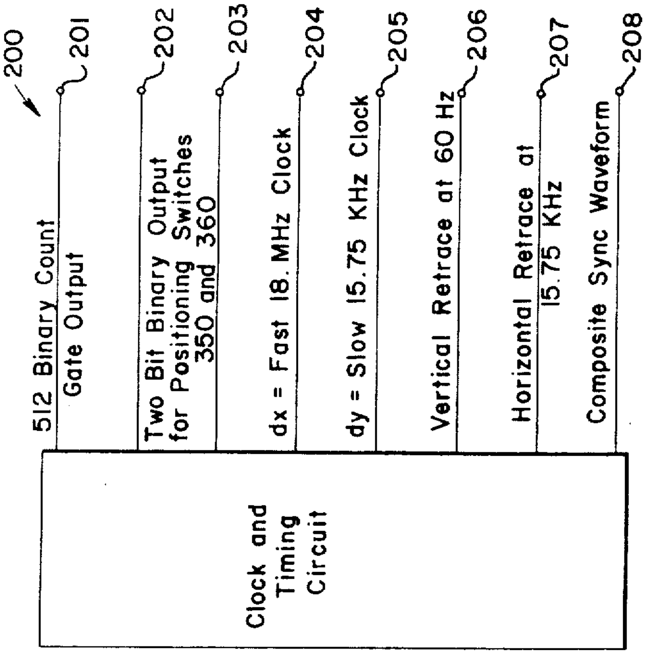
FIG. 3 is a block schematic of the clock and timing circuits available for providing timing and synchronization pulses to the various processing circuits of the several subsystems.

Referring to FIG. 3, clock and timing circuit at 200 has a plurality of outputs. An output at 201 provides 512 possible binary counts from a gate.

A two bit binary 0 and 1 are provided at each of terminals 202 and 203. Such output provides four conditions or 0 and 1 combinations to enable to uniquely direct a switch positioning means to four different positions.

Terminal 204 provides a fast 18MHz clock pulse repetition rate, hereinbelow referred to as *dx*, whereas terminal 205 provides a slow 15.75KHz clock pulse repetition rate, hereinbelow referred to as dy.

Vertical deflection retrace pulse train at a 60Hz repetition rate is provided at terminal 206. Similarly horizontal deflection retrace pulse train at a 15.75KHz repetition rate is provided at terminal 207.

Finally, circuit 200 provides a composite synchronizing waveform at terminal 208. Waveform 208 is fully discussed in publication Bulletin RS-343-A by Electronic Industries Association, dated September 1969.

Figure 4:
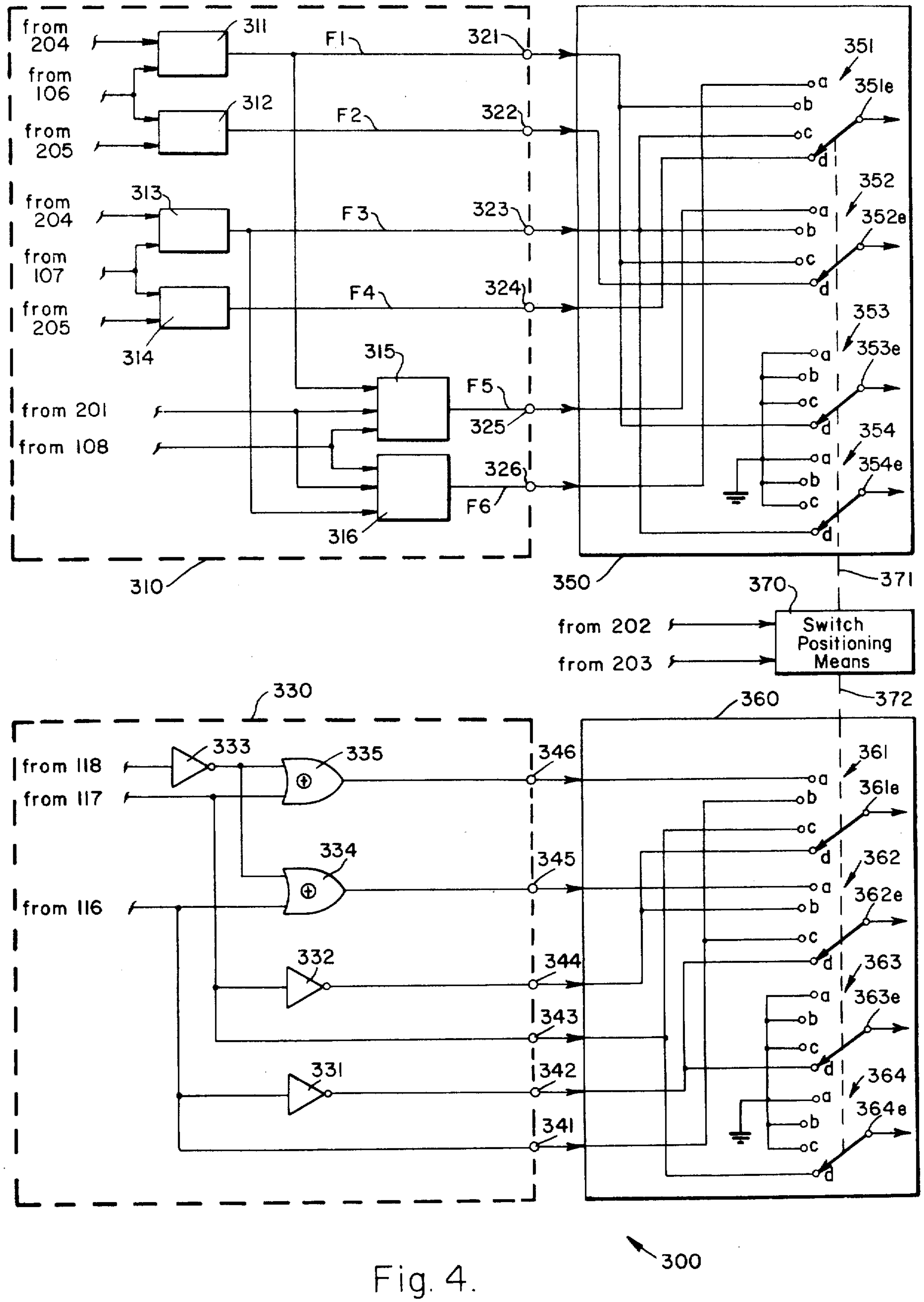
FIG. 4 is a logic and switching schematic of the function processor as utilized in this invention.

Referring to FIGS. 2, 3 and 4, detailed circuitry of the logic of function processor 300 is comprised of logic networks 310 and 330, switches 350 and 360 with four switch positions wherein these switches are ganged together and switched to their several switch positions by switch positioning means 370. The four switch positions are obtained from a pair of binary zero and one pulse generator provided at terminals 202 and 203 of code and timing circuit 200.

Logic network 310 comprises six binary rate multipliers 311, 312, 313, 314, 315 and 316 of the type described as model number SN7497, in Texas Instruments Bulletin CA-160.

Inputs from terminal 204 of circuit 200 provides a fast vertical clock pulse repetition rate at 18MHz, referred to herein as the *dx* function, to binary rate multiplier 311. Binary rate multiplier 311 also receives inputs from terminal 106 of storage register 102 to provide a specific binary value of the sin $\theta$, wherein $\theta$ is the roll angle of the aircraft with respect to an artificial horizon. The output of binary rate multiplier 311 provides a function at terminal 321 and an input to binary rate multiplier 315, denoted in Table 3 hereinbelow as F1.

Inputs from terminal 106 of storage register 102 are also provided to binary rate multiplier 312. Additionally, multiplier 312 receives another input from terminal 205 of clock and timing circuit 200 to provide a slow horizontal clock pulse at a repetition rate at 15.75KHz, referred to herein as the *dy* function. The output of binary rate multiplier 312 will therefore provide a function at terminal 322, denoted in Table 3 hereinbelow at F2.

Binary rate multiplier 313 will receive *dx* inputs from terminal 204 and also the absolute value of the cos $\theta$ in binary bit form from terminal 107 of storage register 103. Outputs from binary rate multiplier 313 will therefore provide a function at terminal 323 and an inpupt to binary rate multiplier 316, denoted in Table 3 hereinbelow as F3.

Binary rate multiplier 314 has inputs in binary form of the absolute values of cos $\theta$ supplied from terminal 106 and a *dy* input from terminal 205. Hence, output of binary rate multiplier 314 will provide a function at terminal 324, denoted in Table 3 hereinbelow as F4.

In addition to the output of binary rate multiplier 311, an input from terminal 108 of storage register 104 will be provided to the input of binary rate multiplier 315. Input from terminal 108 provides the absolute value of vertical offset signal A. Such vertical offset will be referred to further hereinbelow in connection with FIG. 6. Additionally, the output of a 512 binary count gate within clock and timing circuit 200 provides a series of pulses from terminal 201 as an input to binary rate multiplier 315. Accordingly, function F5 as denoted in Table 3, hereinbelow, will be provided at terminal 325.

Similarly, inputs from terminals 201 and 108 and output from binary rate multiplier 313 will be provided as inputs to binary rate multiplier 316. As a result, the output of multiplier 316 at terminal 326 will be in accordance with function F6 as denoted in Table 3 hereinbelow.

TABLE 3

BINARY RATE MULTIPLIER OUTPUTS

| Symbolic Functional Notation | Binary Number as a Product of Binary Rates of the Listed Functions | Available at Terminal No. |
|---|---|---|
| F1 | dx, \|sin θ\| | 321 |
| F2 | dy, \|sin θ\| | 322 |
| F3 | dx, \|cos θ\| | 323 |
| F4 | dy, \|cos θ\| | 324 |
| F5 | dx, \|A\|, \|sin θ\| | 325 |
| F6 | dx, \|A\|, \|cos θ\| | 326 |

Logic circuit 330 comprises two exclusive OR gates 334 and 335 and three inverters 331, 332 and 333 and obtains inputs of the sense of sin θ, cos θ or A in binary form from data source 100. Although the source of data was shown in FIG. 2 as airborne computer 101 in combination with storage registers 102–105, a storage memory such as used in computer terminals may be used instead of computer 101.

Accordingly, the sense of the sin θ (0 or 1 values) provided at terminal 116 is also provided at terminal 341 and as input to inverter 331 and also as an input to exclusive OR gate 334. Terminal 117 of storage register 103 provides a binary signal which represents the sense of the cos θ. Such signal at terminal 117 is also provided at terminal 343, as an input to inverter 332, and as an input to exclusive OR gate 335. Terminal 118 of storage register 104 provides input to inverter 333 representing the sense of vertical offset signal A, expressed in binary form. The output of inverter 333 is present as inputs to gates 334 and 335.

Considering that the only possible values of the sense of sin θ, cos θ and A in binary bit form can only be 0 or 1, the exclusive OR logic gates in conjunction with the several inverters of logic circuit 330, will provide the logic states in binary form at terminals 341–346 in accordance with the binary inputs indicated in Table 4, below.

TABLE 4

BINARY LOGIC STATES DUE TO SENSE OF SIN θ, COS θ, or A

| Terminal No. | Binary Input from 116 | Binary Input From 117 | Binary Input From 118 | Binary Value at Terminal |
|---|---|---|---|---|
| 341 | 0 | | | 0 |
| 341 | 1 | | | 1 |
| 342 | 0 | | | 1 |
| 342 | 1 | | | 0 |
| 343 | | 0 | | 0 |
| 343 | | 1 | | 1 |
| 344 | | 0 | | 1 |
| 344 | | 1 | | 0 |
| 345 | 0 | | 0 | 1 |
| 345 | 1 | | 1 | 1 |
| 345 | 0 | | 1 | 0 |
| 345 | 1 | | 0 | 0 |
| 346 | | 0 | 0 | 1 |
| 346 | | 1 | 1 | 1 |
| 346 | | 0 | 1 | 0 |
| 346 | | 1 | 0 | 0 |

In accordance with this invention signals representative of the functions at terminals 321–326 are made available as inputs to the several switches comprising switch 350, and signals representative of the binary states indicated at terminals 341–346 are made available as inputs to the several switches comprising switch 360.

Switch means as at 350 and at 360 are each provided with four switches which are ganged together by coupling means to switch positioning means 370. Four positions are provided for each of switches 351, 352, 353 and 354 comprising switch means 350 and four positions are also provided for each of switches 361, 362, 363 and 364 comprising switch means 360. The switches in switch means 350 are ganged by a coupling schematically represented at 371, and the switches in switch means 360 are ganged by a coupling schematically represented at 372. Hence, when movable arm **351*e* of switch 351 is at the a position of switch 351, movable arm 361*e* of switch 361 is at the a position of switch 361. Hence, all movable arms 351*e*, 352*e*, 353*e*, 354*e*, 361*e*, 362*e*, 363*e* and 364*e* are at the same lettered position of their respective switches when a binary zero or one logic state is made available to switch positioning means 370 from terminals 202 or 203 of clock and timing circuit 200**.

Accordingly, terminal 326 provides an input to contact *a*, terminal 321 provides an input to contact *b*, terminal 323 provides an input to contact *c*, and terminal 324 provides an input to contact *d* of switch 351. Switch arm **351*e* provides output signals from any of the contact positions of switch 351** with which it cooperates.

Terminal 325 provides an input to contact *a*, terminal 323 provides an input to contact *b*, terminal 321 provides an input to contact *c*, and terminal 322 provides an input to contact *d* of switch 352. Switch arm **352*e* provides output signals from any of the contact positions of switch 352** with which it cooperates.

Contacts *a, b* and *c* of switch 353 are at ground potential so that no signal will be imposed on switch arm 353e when same is in the a, b or c positions, whereas terminal 321 is connected to contact d of switch 353 so that switch arm 353e of switch 353 will provide an output therefrom when such switch arm is in the d position of switch 353.

Contacts a, b and c of switch 354 are at ground potential so that no signal will be imposed on switch arm 354e when same is in the a, b or c positions, whereas terminal 323 is connected to contact d of switch 354 so that switch arm 354e of switch 354 will provide an output therefrom when such switch arm is in the d position of switch 354.

Coupling means 371, such as a shaft or the like, gang switches 351–354 with switch positioning means 370.

Terminal 346 provides an input to contact a, terminal 341 provides an input to contact b, terminal 343 provides an input to contact c and terminal 344 provides an input to contact d of switch 361. Switch arm 361e provides output signals from any of the contact positions of switch 361 with which it cooperates.

Terminal 345 provides an input to contact a, terminal 344 provides an inpupt to contact b, terminal 341 provides an input to contact c and terminal 342 provides an input to contact d of switch 362. Switch arm 362e provides output signals from any of the contact positions of switch 362 with which it cooperates.

Contacts a, b and c of switch 363 are at ground potential so that no signal will be imposed on switch arm 363e when same is in the a, b or c positions, whereas terminal 342 is connected to contact d of switch 363 so that switch arm 363e of switch 363 will provide an output therefrom when such switch arm is in the d position of switch 353.

Contacts a, b and c of switch 364 are at ground potential so that no signal will be imposed on switch arm 364e when same is in the a, b or c positions, whereas terminal 343 is connected to contact d of switch 354 so that switch arm 364e will provide an output therefrom when such switch arm is in the d position of switch 354.

Coupling means 372, such as a shaft or the like, gang switches 361–364 with switch positioning means 370.

Hence, switch positioning means in response to binary coded signals from 202 and 203 terminals will actuate switches 351–354 and switches 361–364 to like contact labeled positions in accordance with a two bit binary code triggering means 370 to step the aforestated switches to their a, b, c and d positions in accordance with the requirements of scanning the rotated raster as discussed in connection with FIG. 6, below.

Referring to FIGS. 1, 2, 3, 4 and 5, signals provided by data source 100, clock and timing circuit 200 and function processor 300 will be available as inputs to up and down counter 500.

Counter 500 is comprised of individual up and down counters 510, 520, 530 and 540, each of which comprises four serially connected counters of the type SN 74 LS 191 as manufactured by Texas Instruments, Inc. of Dallas, Texas and described in its bulletin number DL-S-7211865 of December 1972. The series method of connection of these counters is well known in the art.

Accordingly, the output of switch arms 351e and 361e are provided as inputs to counter 510. Also provided as an input to counter 510 is the vertical retrace signal from terminal 206, and the TWO's complement output of P as provided at terminal 109.

Similarly, the output of switch arms 352e and 362e are provided as inputs to counter 520. Also provided as an input to counter 520 is the vertical retrace signal from terminal 206.

The output of counter 510 is defined at cable 511 as $V_o$ which represents a vertical ordinate position of a transformed cartesian coordinate pair along the left hand or vertical side of the transformed or rotated raster from where each of the horizontal lines comprising such rotated or phantom raster start their scan across the video display tube. The output of counter 520 is defined at cable 521 as $U_o$ represents a horizontal ordinate position of the transformed coordinate pair, to provide by a series of values of $U_o$, $V_o$ each of the plurality of 512 points along the left-hand or vertical side of the transformed raster used as the start scan position for each of the 512 lines.

Cables 511 and 512 therefore represent $V_o$, $U_o$ inputs to counters 530 and 540 respectively.

Additionally, counter 530 is provided with inputs from switch arms 353e and 363e, input from horizontal retrace terminal 207 and input from the TWO's complement output of P as provided at terminal 109.

Counter 540 is provided with inputs from switch arms 354e and 364e, and an input from the horizontal retrace output signal from terminal 207.

With the inputs provided to counters 510–540 as hereinabove stated, transformed U and V coordinate values are provided respectively as outputs from counter 540 at cable 541 and from counter 530 at cable 531; coordinates U, V generally describing all points in the field of the rotated raster, except the start-scan points $U_o$, $V_o$. U and V values will therefore be provided as inputs to read only memory 600 for providing the transformation necessary to a conventional X-Y coordinate system in a television receiver 800 so as to view on a television screen the roll angle $\theta$ of an aircraft with respect to an artificial horizon provided in memory 600 by means of rotation of a raster having transformed cartesian coordinates (U, V) that displace the raster by angle $\theta$ with respect to a conventional unrotated (X, Y) cartesian coordinate system.

Compensation by aircraft controls for roll angle $\theta$ can therefore be easily accomplished by viewing the television receiver screen.

The method in which counters 500 function is as follows: Switch arms 351e, 352e, 353e and 354e provide clock inputs to counters 510, 520, 530 and 540, respectively. Switch arms 361e, 362e, 363e and 364e provide up and down count control of counters 510, 520, 530 and 540, respectively. Signals from terminal 206 provides the requisite load control for counters 510 and 520, whereas signals from terminal 207 provides the necessary load control to counters 530 and 540. Terminal 109 provides binary numerical values in the TWO's complement code signals, used to preset counter 510. Counter 510 is preset to zero, and hence there is no need to provide any input from any storage register to the counter for presetting purpose. The $V_o$ data at 511 is used to preset counter 530, and the $U_o$ data at 521 is used to preset counter 540.

Figure 5:
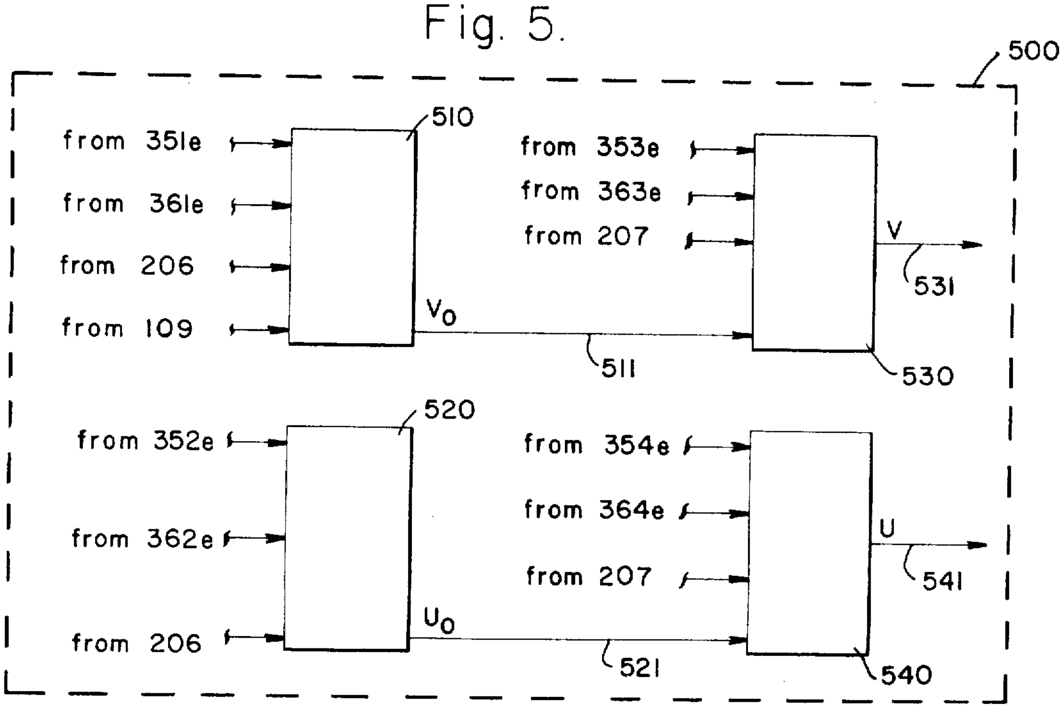
FIG. 5 is a block diagram schematic of the up and down counters as energized by the function processor.
Figure 6:
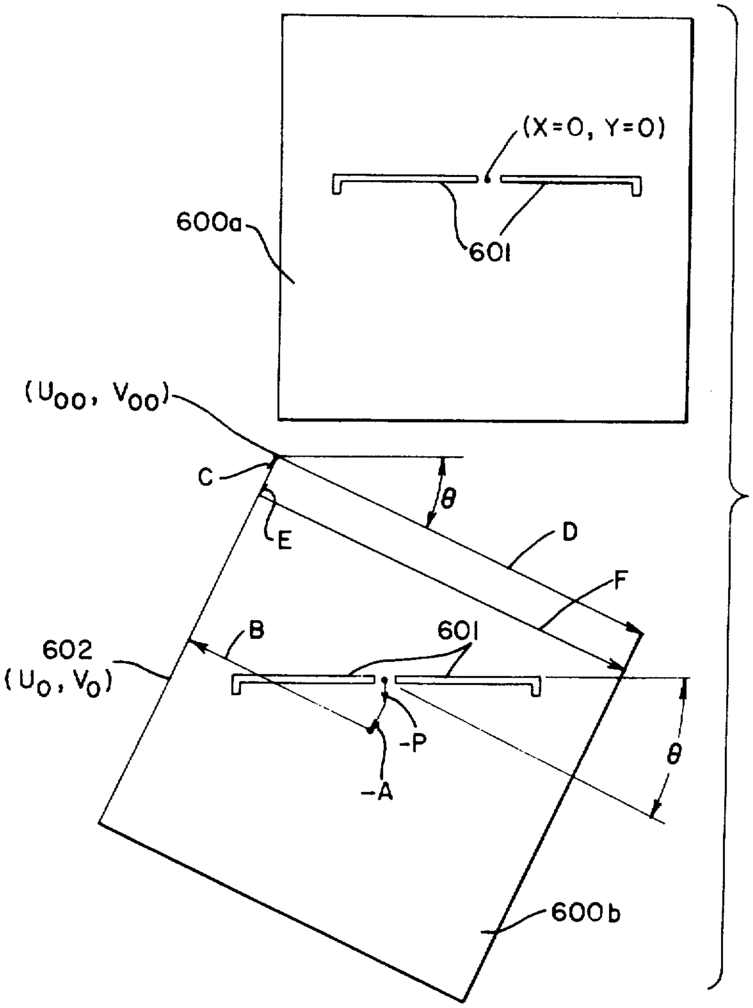
FIG. 6 is a plan view of a typical symbol permanently imposed within a memory wherein one view shows an unrotated raster in conventional cartesian coordinate system and another view shows a rotated raster by virtue of a transformed cartesian coordinate system, ready for viewing on a television receiver.

Referring to FIGS. 1, 5 and 6, the transformation of the conventional X, Y cartesian coordinate system to the U, V cartesian coordinate system, which is the X, Y system shifted by roll angle $\theta$, is accomplished by the use of the U and V outputs from counters 540 and 530 respectively, to enable viewing of artificial horizon symbol 601 in rotated raster 600b.

In FIG. 6, the unrotated raster is shown at 600a, so that if the 512 scan lines of the system were to sweep across the confines of 600*a*, the artificial horizon permanently registered in memory 600 would show up in a perfectly horizontal relationship to area represented by 600*a*, and the X=0, Y=0 or origin of the X-Y cartesian coordinate system would be at the center of 600*a*. In this instance there would be no roll angle $\theta$ shown, as viewing of such roll angle $\theta$ is dependent upon rotation of the raster with respect to horizon 601.

It is pointed out that symbol 601 may be defined as a location of cartesian coordinate points. In raster 600*a* and 600*b* such symbol is registered in read only memory 600, and the representation of memory 600 as containing both rasters 600*a* and 600*b* is only provided so as to enable understanding by the reader of the method of transformation from the X-Y coordinate system to the U-V coordinate system. In actuality, only a raster of 512 scan lines defined at 600*b* is displayed on television receiver 800, thereby showing the relative angular displacement $\theta$ of the raster 600*b* with respect to symbol 601.

To rotate any point it is necessary to change its X location and Y location such that it will retain its original geometric relation to all other points and at the same time appear to pass through the loci of a circle on the sensing raster. This is done by computing such loci for all points in a symbol, like symbol 601. A much simpler method is to regard the symbol as an invariant set of points and scan the loci of these points from an angle, such as angle $\theta$.

Numbers as shown in Tables 1 and 2, above, represent each point of an X-Y cartesian coordinate system, two such numbers being required to represent any point in a raster of 512 horizontal lines and such vertical spacing as required between the horizontal lines to yield the needed line resolution of the raster.

To rotate a raster it will be necessary to utilize the numerical values of P shown in raster 600*b* as starting from the origin of the X-Y cartesian coordinate system and being measured in a negative direction, thereby taking on the negative values of P in accordance with Table 2. The magnitude and negative sense of the vertical offset A may be represented by numbers as shown in Table 1, and the magnitude of A can best be represented in 600*b* as adding the value of A in a vertical direction with respect to the scan lines comprising raster 600*b*.

In forming raster 600*b*, 512 horizontal scan lines will be a series of points represented by the aforesaid numbers in Table 1 and a series of field points for vertical spacing between the scan lines generated by the above-described counters, the counting rate of which is determined by the above-described rate multipliers driven by clocks at fixed frequencies.

By varying the rate at which the numbers stated in Tables 1 and 2 change, and the point at which they start, a raster such as 600*b* can be synthesized in which every point has been rotated in a way analogous to the rotation of a camera. To do this it is required that each point, or number at a given time satisfy expressions for coordinate transformation from the conventional cartesian coordinate system to a U and V coordinate system, which is the X and Y system shifted by an angle $\theta$, in accordance with the following equations:

$$U = X \sin \theta + Y \cos \theta$$
$$V = X \cos \theta - Y \sin \theta$$

where

U = X position of a point after rotation
V = Y position of a point after rotation
X = x position of a point Y = y position of a point In a television raster all points represent precise times with respect to synchronizing pulses. Mechanization of the above equation by this invention provides the ability to vary the starting location of each line, to vary the rate of change of each line and to vary the start location of any point of each field.

Raster 600*b* shows that symbol 601 representing an artificial horizon is displayed on a cathode-ray indicator of television receiver 800 in an aircraft cockpit, which indicates to the pilot the aircraft attitude with respect to the horizon. Symbol 601 in raster 600*a* represents the horizon if the aircraft is level, that is if angle $\theta$, pitch P and offset A are zero. In raster 600*b* symbol 601 would be seen as if $\theta$ were displaced with respect to the symbol in raster 600*a*. If the aircraft was flying downward the pitch of the aircraft would be evident from an apparent upward displacement of symbol 601.

In raster 600*b*, the starting point of the transformed raster is designated for convenience as the coordinate points $U_{oo}$, $V_{oo}$, and the start point $U_o$, $V_o$ of each scan line from at the left side of raster 600*b* is designated as 602. Any point in the field or confines of raster 600*b* may be designated generally as a U, V cartesian coordinate point defined mathematically by the foregoing equations.

The method of implementation may best be described in a set of sequential operations performed by the counters of FIG. 5.

Counter 510 is first preset so that $V_o = -P$ with respect to X=0, Y=0 of the X-Y cartesian coordinate system. This event will occur when vertical retrace signal from terminal 206 is applied to this counter.

Counters 510 and 520 will count the vertical offset distance in a negative direction −A with respect to U=0, V=0, of the U-V cartesian coordinate system. This will occur when switches 350 and 360 are in position a. The U-V coordinate system is the X-Y coordinate system the axes of which are transformed or shifted by roll angle $\theta$ of the aircraft.

Counters 510 and 520 will then count distance B. This will occur when switches 350 and 360 are in position *b*. Distance B is created by virtue of the fact that function F3 representing the negative value of the cos $\theta$, and function F1 representing the positive value of the sin $\theta$, are provided as inputs respectively to switches 352 and 351 at positions *b*. In this switch position *c* counters 510 and 520 will count the length of C from the termination point of B, in similar manner. With termination of this count operation, start of scan of the lines of raster 600*b* will have been located at point defined at $U_{oo}$, $V_{oo}$. Hence, the output at 531 will be $V=V_{oo}$, and at 541 will be $U=U_{oo}$.

Line D, representing the first of the 512 scan lines, is scanned by virtue of counters 530 and 540 counting at predetermined rates respectively given for the V clock as defined by F1 and for the U clock as defined by F3, in Table 3 hereinabove. Scan line D, scan line F, vertical displacement E between scan lines and all subsequent scan lines to complete the 512 lines of raster 600*b* are generated when switches 350 and 360 are in the *d* position.

Counters 510 and 520 advance the counting operation by one count to provide displacement E along the $U_o$-$V_o$ start coordinates defined in terms of F2 for $U_o$, and F4 for $V_o$ coordinate point. Accordingly, counters 530 and 540 are preset by virtue of execution of F2 and F4 signals as inputs thereto respectively at lines 521 and 511. The second line F of the 512 horizontal scan lines is scanned starting at the terminal point of displacement E in similar manner as line D was scanned. Subsequent lines of the 512 scan lines are also similarly scanned.

When all 512 lines have been scanned, entire raster 600*b* will have been created to create one of the 30 frames generated per second commonly used in a television system, and the scanning cycle will be repeated to start a new frame beginning the scan action at $U_{oo}$, $V_{oo}$.

If for instance, the aircraft rolls to the right to form angle $\theta$ with respect to the horizon, then horizon symbol 601 will visually show up as being displaced by the same angle $\theta$ with respect to raster 600*b* or vice-versa.

If for example, the aircraft nose pitches downward slightly, horizon symbol 601 will appear to be above the center of the screen of receiver 800 or raster 600*b*. If the nose of the aircraft pitches upward symbol 601 will appear to be below the center of raster 600*b* as viewed on television receiver 800.

If artificial horizon symbol 601 is not desired to be centrally positioned as shown in FIG. 6, the value of A fed from data source 100 can be used to shift symbol 601 upward or downward in raster 600*b* of television screen as desired.

In the foregoing computation of points in raster 600*b* it is to be understood that function processor 300, up and down counters 500, registration of the raster points in read only memory 600 will process the binary equivalent numbers, and their sense conditions in binary form, as shown in Tables 1 and 2 for computation of roll angle $\theta$, Pitch P and vertical displacement A, as illustrated in FIG. 6 hereof.

In the foregoing description, raster 600*a* is the same raster as might be conventionally created on the screen of a television receiver such as 800. As a raster such as 600*a* is being generated in receiver 800, raster 600*b*, which is the raster that addresses read only memory 600 in the manner hereinabove described, the video signal applied to receiver 800 input is representative of symbol 601 in raster 600*b*. Therefore, symbol 601 represents the video by virtue of the presence of raster 600*b*, and hence symbol 601 is capable of being viewed on the screen of receiver 800 in its oriented position.

It is obvious that video output signals from memory 600 utilized herein, is combined with composite waveform 208, provided by circuit 200, into resistive mixing circuit 700, to provide a synchronized video inpupt to television receiver for viewing symbol 601 in raster 600*b* as hereinabove described.

We claim:

1. A digital system that angularly orients a television raster with respect to a symbol fixed in a memory of said system by coordinate axes rotation, comprising in combination:

a data source for providing data signals and a timing source for providing timing signals, as outputs of said data and timing sources respectively;

function processing means, electrically connected to the data and timing sources, for providing outputs therefrom in binary form, the function processing means including means for multiplying the rates of change of all absolute values of each argument and modulus of said data signals;

counting means, electrically connected to the function processing means, responsive to outputs from the function processing means providing binary information to said memory, for angularly rotating said coordinate axes during operative mode of said system.

2. The invention as stated in claim 1, wherein said means for multiplying also generates a plurality of binary coded functions during said operative mode in accordance with the data and timing signals provided as inputs thereto and including:

logic means, electrically connected to the data source, for determining the polarity of each of the coded functions; and switching means, electrically fed by the means for multiplying and logic means, for providing inputs to the counting means.

3. The invention as stated in claim 2, wherein the function processing means further includes:

switch positioning means, coupled to the switching means, fed by a two-bit binary output signal from the timing source for driving the switching means during said operative mode.

4. The invention as stated in claim 3, wherein said data source includes means for storing in binary form absolute trigonometric values of data as provided by said data source.

5. The invention as stated in claim 4, wherein the means for multiplying comprises a plurality of rate multiplier circuits, each providing one of the binary coded functions.

6. The invention as stated in claim 5, wherein the logic means consists of a plurality of exclusive OR gates in combination with logic inversion circuits.

7. The invention as stated in claim 6, including:

a memory circuit electrically connected to and excited by the counting means; and a mixing circuit electrically connected to said memory circuit for mixing signals inputted to the mixing circuit from the memory and timing source.

8. The invention as stated in claim 7, including television receiving means connected to the output of the mixing circuit.

9. A digital system that angularly orients a television raster with respect to a symbol fixed in the memory of said system by coordinate axes rotation, comprising in combination:

a data source for providing data signals and a timing source for providing timing signals, as outputs of said data and timing sources respectively;

function processing means, electrically connected to the data and timing sources and responsive to said data and timing signals, all said signals being in binary form;

counting means, electrically connected to the function processing means, responsive to outputs of the function processing means providing binary information to said memory, for angularly rotating said coordinate axes during operative mode of said system;

rate multiplication means, electrically connected to the data and timing source, generating a plurality of binary coded functions during said operative mode in accordance with the data and timing signals inputted thereto;

logic means, electrically connected to the data source, for determining the polarity of each of the binary coded functions; and switching means, electrically fed by the rate multiplication and logic means, for providing inputs to the counting means, said memory being a read only type.

10. The invention as stated in claim 9, wherein said data source includes means for storing in binary form absolute trigonometric values of said data signals.

11. The invention as stated in claim 10, wherein the rate multiplication means comprises a plurality of rate multiplier circuits, each providing one of the binary coded functions.

12. The digital system as stated in claim 11, wherein said function processing means further includes:

a binary logic circuit, connected to and excited by the data source during said operative mode, said binary logic circuit determining the polarity of each of the binary coded functions; and switching means, excited by and coupled to the rate multiplication means and binary logic circuit, for providing different binary outputs therefrom in accordance with each position of the switching means.

13. The invention as stated in claim 11, wherein the logic means consists of a plurality of exclusive OR gates in combination with logic inversion circuits.

14. The invention as stated in claim 13, including a mixing circuit responsive to signal outputs from said memory and timing means.

15. The invention as stated in claim 14, including television receiving means connected to the output of the mixing circuit.

* * * * *

UNITED STATES PATENT AND TRADEMARK OFFICE

CERTIFICATE OF CORRECTION

PATENT NO. : 3,925,765

DATED : December 9, 1975

INVENTOR(S) : Ted W. Berwin et al

It is certified that error appears in the above-identified patent and that said Letters Patent are hereby corrected as shown below:

Column 13, Claim 1, Line 65;

After "signals;" insert_ _ and _ _

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,925,765 Dated December 9, 1975

Inventor(s) Ted W. Berwin et al. Page 1 of 5

It is certified that error appears in the above-identified patent and that said Letters Patent are hereby corrected as shown below:

Figures 1 through 6 should appear as shown on the attached sheets.

Signed and Sealed this

Second Day of November 1976

[SEAL]

*Attest:*

RUTH C. MASON
*Attesting Officer*

C. MARSHALL DANN
*Commissioner of Patents and Trademarks*